United States Patent
Tsujino et al.

(10) Patent No.: US 11,440,562 B2
(45) Date of Patent: Sep. 13, 2022

(54) PARKING ASSIST SYSTEM

(71) Applicant: HONDA MOTOR CO., LTD., Tokyo (JP)

(72) Inventors: Miki Tsujino, Saitama (JP); Yuki Hara, Saitama (JP); Masaaki Kawano, Saitama (JP); Hiroshi Yamanaka, Saitama (JP); Yasushi Shoda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 4 days.

(21) Appl. No.: 17/101,061

(22) Filed: Nov. 23, 2020

(65) Prior Publication Data
US 2021/0179130 A1 Jun. 17, 2021

(30) Foreign Application Priority Data
Dec. 13, 2019 (JP) .............................. JP2019-225939

(51) Int. Cl.
*H04N 5/44* (2011.01)
*B60W 50/14* (2020.01)
(Continued)

(52) U.S. Cl.
CPC ............ *B60W 50/14* (2013.01); *B60W 10/18* (2013.01); *B60W 30/06* (2013.01); *B60W 50/12* (2013.01); *B60W 2050/146* (2013.01)

(58) Field of Classification Search
CPC ...... B60W 50/14; B60W 10/18; B60W 30/06; B60W 50/12; B60W 2050/146; B62D 15/0285
See application file for complete search history.

(56) References Cited

U.S. PATENT DOCUMENTS 10,234,868 B2 * 3/2019 Lavoie ............... B62D 15/0285
2016/0313731 A1 * 10/2016 Leppanen .............. B60K 35/00
(Continued)

FOREIGN PATENT DOCUMENTS

| JP | 2018134949 A | 8/2018 |
| JP | 2018140757 A | 9/2018 |
| JP | 2018197080 A | 12/2018 |

OTHER PUBLICATIONS

Notice of Reasons for Refusal for Patent Application JP 2019-225939 received Jul. 20, 2021; 8 pp.

*Primary Examiner* — Munear T Akki
(74) *Attorney, Agent, or Firm* — Armstrong Teasdale LLP

(57) ABSTRACT

A parking assist system includes: a control device configured to execute an automatic parking process and an automatic unparking process. The control device is configured to cause a notification device to output an end-of-parking notification when, in the automatic parking process, the vehicle has reached the target parking position and the control device ends the automatic parking process, and to cause the notification device to output an instruction notification to request the occupant to perform a prescribed operation on an operation member when, in the automatic unparking process, the vehicle has reached the target unparking position and the control device ends the automatic unparking process, and to cause the notification device to output an end-of-unparking notification when the prescribed operation is detected.

6 Claims, 7 Drawing Sheets

(51) Int. Cl.
  *B60W 30/06* (2006.01)
  *B60W 10/18* (2012.01)
  *B60W 50/12* (2012.01)

(56) References Cited

U.S. PATENT DOCUMENTS

| | | |
|---|---|---|
| 2017/0072947 A1* | 3/2017 | Lavoie ............ B60W 30/18027 |
| 2017/0144656 A1* | 5/2017 | Kim ................... B62D 15/0285 |
| 2018/0215413 A1* | 8/2018 | Inagaki .............. B62D 15/0285 |
| 2018/0237031 A1 | 8/2018 | Imai et al. |
| 2018/0244312 A1 | 8/2018 | Masaya et al. |
| 2018/0315312 A1* | 11/2018 | Hayakawa ............. G08G 1/143 |
| 2019/0009773 A1* | 1/2019 | Miyahara .............. B62D 15/028 |
| 2019/0344828 A1* | 11/2019 | Omori .................. B60W 50/14 |
| 2020/0282975 A1* | 9/2020 | Minase .............. B62D 15/0285 |
| 2021/0179085 A1* | 6/2021 | Nakada ............... B60W 40/076 |

* cited by examiner

PARKING ASSIST SYSTEM

TECHNICAL FIELD

The present invention relates to a parking assist system for automatically moving a vehicle from a passage to a parking position or from a parking position to a passage.

BACKGROUND ART

JP2018-140757A discloses a parking assist system for executing an automatic parking process to autonomously move the vehicle to a target parking position and an automatic unparking process to autonomously move the vehicle to a target unparking position. The parking assist system includes a display device and an audio output device and notifies the state of execution of the steering control and the vehicle speed control in the automatic parking process and the automatic unparking process to an occupant of the vehicle via the display device and the audio output device.

When the automatic parking process ends, usually, the occupant of the vehicle does not drive the vehicle. On the other hand, when the automatic unparking process ends, the occupant will start driving the vehicle. Therefore, when the automatic unparking process is completed, it is desirable to reliably make the occupant recognize that vehicle control is transferred to the occupant.

SUMMARY OF THE INVENTION

In view of the foregoing background, an object of the present invention is to provide a parking assist system capable of allowing the occupant of the vehicle to recognize the end of the automatic parking process and the end of the automatic unparking process.

To achieve the above object, one aspect of the present invention provides a parking assist system (1), comprising: a control device (15) configured to control a powertrain (4) including a transmission (16), a brake device (5), and a steering device (6) to execute an automatic parking process in which a vehicle is autonomously moved to a target parking position and an automatic unparking process in which the vehicle is autonomously moved to a target unparking position; a notification device (14) configured to be controlled by the control device to make a notification to an occupant of the vehicle; and an operation member (11) configured to receive an operation performed by the occupant, wherein the control device is configured to cause the notification device to output an end-of-parking notification when, in the automatic parking process, the vehicle has reached the target parking position and the control device ends the automatic parking process, and to cause the notification device to output an instruction notification to request the occupant to perform a prescribed operation on the operation member when, in the automatic unparking process, the vehicle has reached the target unparking position and the control device ends the automatic unparking process, and to cause the notification device to output an end-of-unparking notification when the prescribed operation is detected.

According to this configuration, the occupant of the vehicle can recognize the end of the automatic parking process and the automatic unparking process based on the end-of-parking notification and the end-of-unparking notification. In addition, since the occupant is requested to perform a prescribed operation according to the instruction notification before the automatic unparking process ends, the occupant can recognize that vehicle control is transferred to the occupant.

In the above configuration, preferably, the end-of-parking notification and the end-of-unparking notification are in notification modes that can be recognized to be identical by the occupant. Alternatively, the end-of-parking notification and the end-of-unparking notification may be in an identical notification mode. Specifically, the end-of-parking notification and the end-of-unparking notification may consist of an identical notification sound.

According to this configuration, the occupant can recognize the end of travel control including the automatic parking process and the automatic unparking process based on the end-of-parking notification and the end-of-unparking notification that are made in the identical notification mode. Since the notification mode of the end-of-parking notification and the notification mode of the end-of-unparking notification are the same, it is possible to limit the kinds of notification mode. Thereby, the meanings of the notifications that the occupant should learn are reduced, and the convenience can be improved.

In the above configuration, preferably, the instruction notification and the end-of-unparking notification are in different notification modes.

According to this configuration, the occupant can recognize the instruction notification in distinction from the end-of-unparking notification.

In the above configuration, preferably, the prescribed operation is an operation of the operation member for activating the brake device or the powertrain.

According to this configuration, vehicle control can be transferred to the occupant while the vehicle is stopped.

In the above configuration, preferably, when the prescribed operation is not detected during a prescribed period after the control device caused the notification device to output the instruction notification, the control device executes a stop maintaining process to restrict rotation of a wheel of the vehicle, causes the notification device to output the end-of-unparking notification, and ends the automatic unparking process.

According to this configuration, even when the occupant does not perform the prescribed operation, the vehicle is maintained in the stopped state, and vehicle control is transferred to the occupant. Namely, the parking assist system can end the automatic unparking process while the vehicle is stopped.

In the above configuration, preferably, in the stop maintaining process, the control device performs at least one of setting of a shift position of the transmission in a parking range and activation of the brake device.

According to this configuration, the vehicle is reliably maintained in the stopped state.

According to the foregoing configuration, the parking assist system can reliably allow the occupant of the vehicle to recognize the end of the automatic parking process and the end of the automatic unparking process.

DESCRIPTION OF THE PREFERRED EMBODIMENT(S)

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
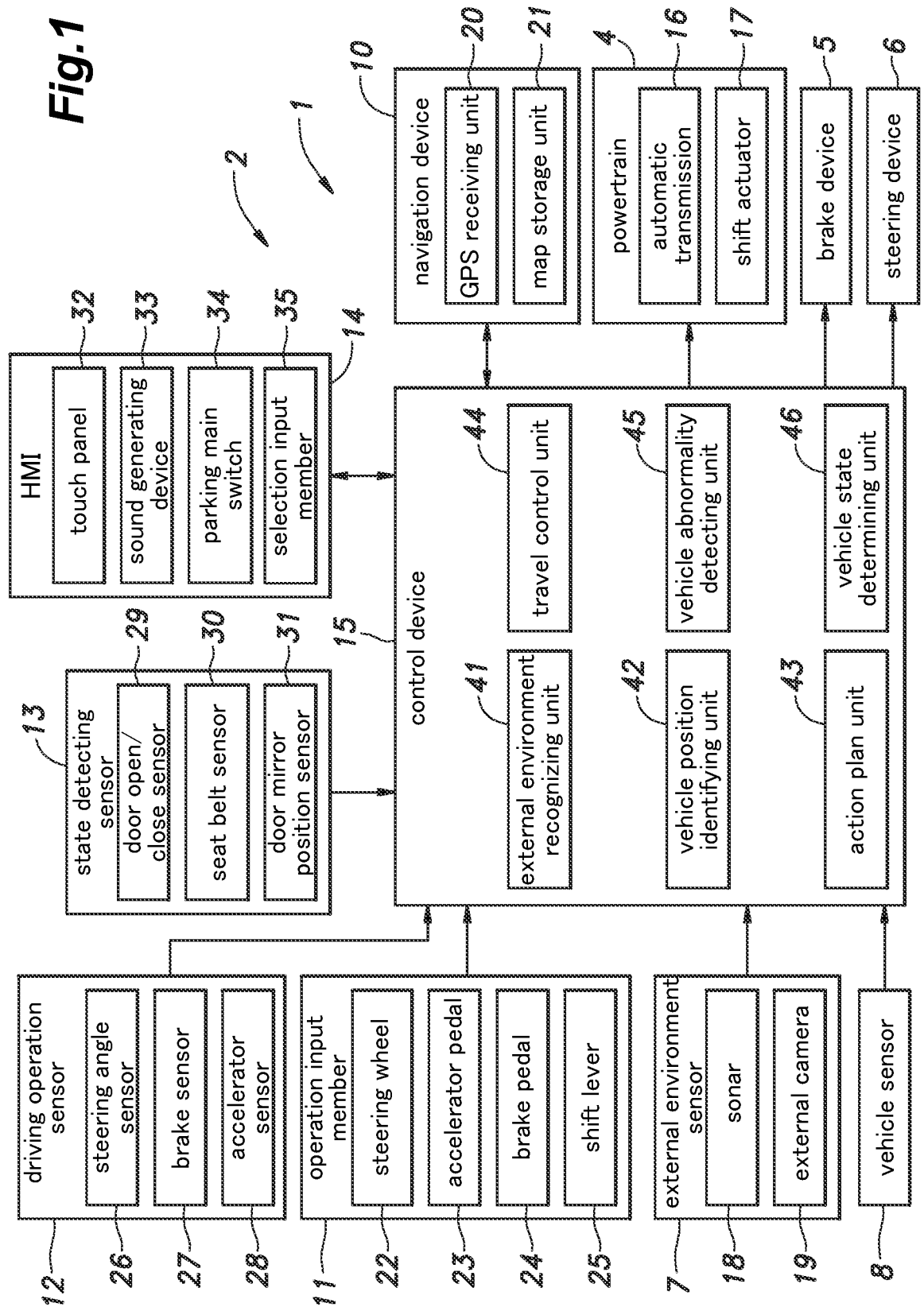
FIG. 1 is a functional configuration diagram of a vehicle in which a parking assist system is installed.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (a shift member). The shift lever 25 is configured to receive an operation for selecting the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes: the control device 15; the external environment sensor 7 (the sonar 18 and the external camera 19), which serves as a target position candidate detection device; the touch panel 32, which serves as a display device on which a selection operation can be performed; the external camera 19, which serves as an imaging device; the selection input member 35; and the operation input member 11.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Figure 3A:
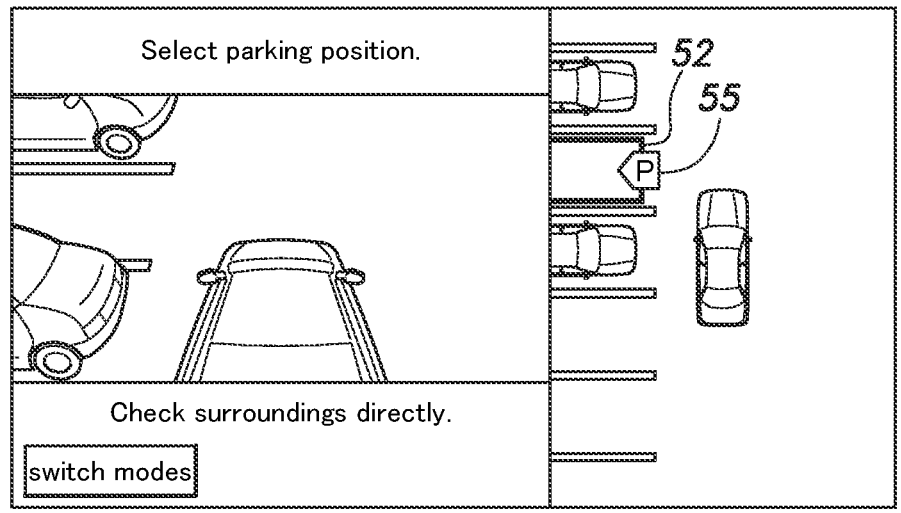
FIG. 3A is a diagram of a screen display of a touch panel during an acquisition process.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space 52 (see FIG. 3) delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines that, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

Figure 2:
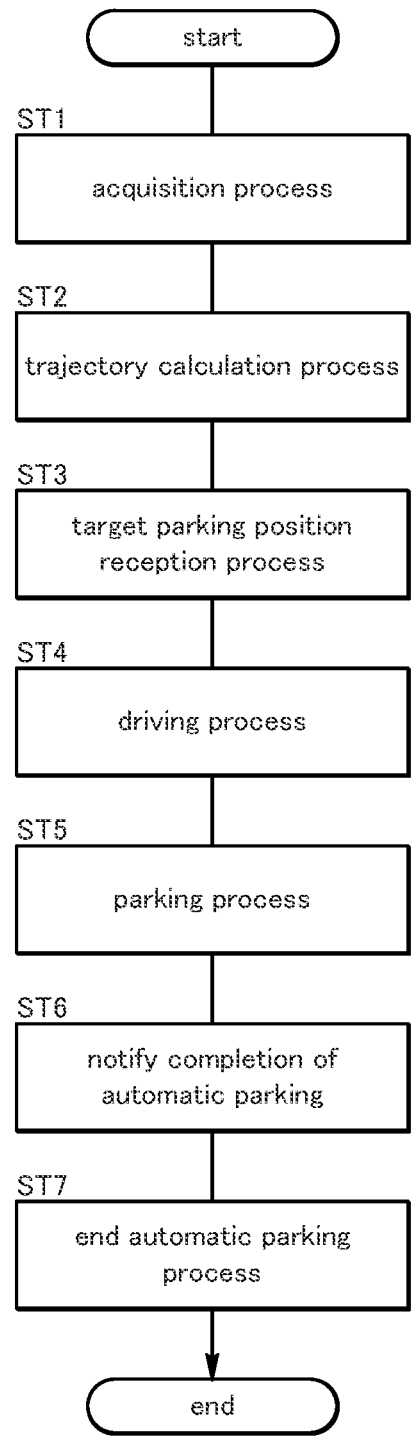
FIG. 2 is a flowchart of an automatic parking process.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon 55 that corresponds to the frame in at least one of the look-down image and the bird's-eye image (in the look-down image in FIG. 3A) in an overlapping manner. The icon 55 consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
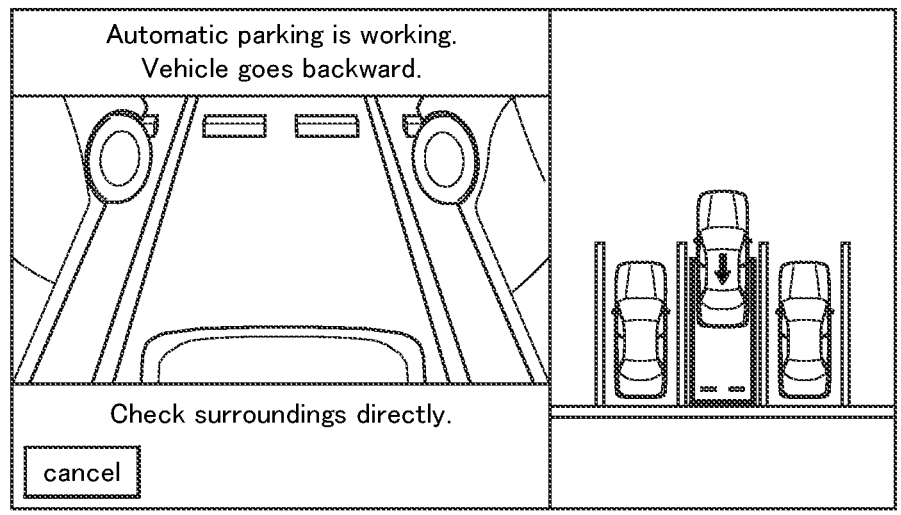
FIG. 3B is a diagram of a screen display of a touch panel during a driving process.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon 55 that corresponds to the thick frame such that the thick frame and the icon 55 overlap with the look-down image. This icon 55 consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle (a reversing operation for reversing the travel direction of the vehicle). The switching operation may be executed repeatedly, or may be executed only once.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

When the vehicle state determining unit 46 determines that the vehicle is in the prohibition state during the driving process, the action plan unit 43 displays a notification that the automatic parking is suspended or canceled on the touch panel 32 and executes a deceleration process to decelerate the vehicle to stop the same. Thus, when there is a predetermined operation input by the occupant via the operation input member 11, the action plan unit 43 executes the deceleration process, whereby uneasiness that would be felt by the occupant if the movement of the vehicle were continued can be avoided.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 activates the parking brake device.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

Figure 3C:
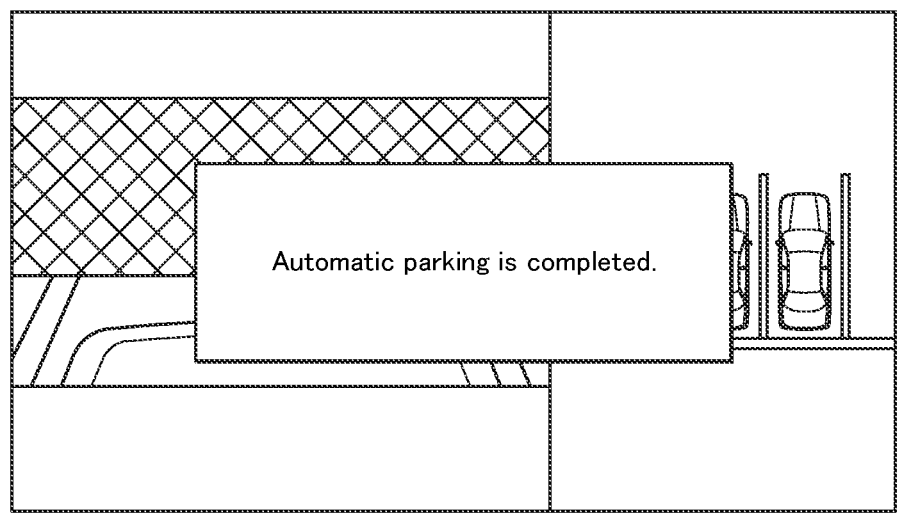
FIG. 3C is a diagram of a screen display of a touch panel when an end-of-parking display is displayed.

After the parking process (ST5) ends, the action plan unit 43 causes the HMI 14 to output an end-of-parking notification (ST6). The HMI 14 functions as a notification device configured to make a notification to the occupant. Namely, the action plan unit 43 causes the HMI 14 to output the end-of-parking notification when, in the automatic parking process, the vehicle reaches the target parking position and the action plan unit 43 ends the automatic parking process. The end-of-parking notification includes at least one of image information and/or text information displayed on the touch panel 32 and voice and/or notification sound output from the sound generating device 33. The end-of-parking notification may be a pop-up message displayed on the screen of the touch panel 32, as shown in FIG. 3C, for example. Preferably, the action plan unit 43 causes the touch panel 32 do display the pop-up message serving as the end-of-parking notification for a prescribed period of time. Thereafter, the action plan unit 43 erases the end-of-parking notification from the touch panel 32, and preferably displays the operation screen of the navigation device 10 or the map screen on the touch panel 32.

After causing the HMI 14 to output the end-of-parking notification, the action plan unit 43 ends the automatic parking process (ST7).

Figure 4:
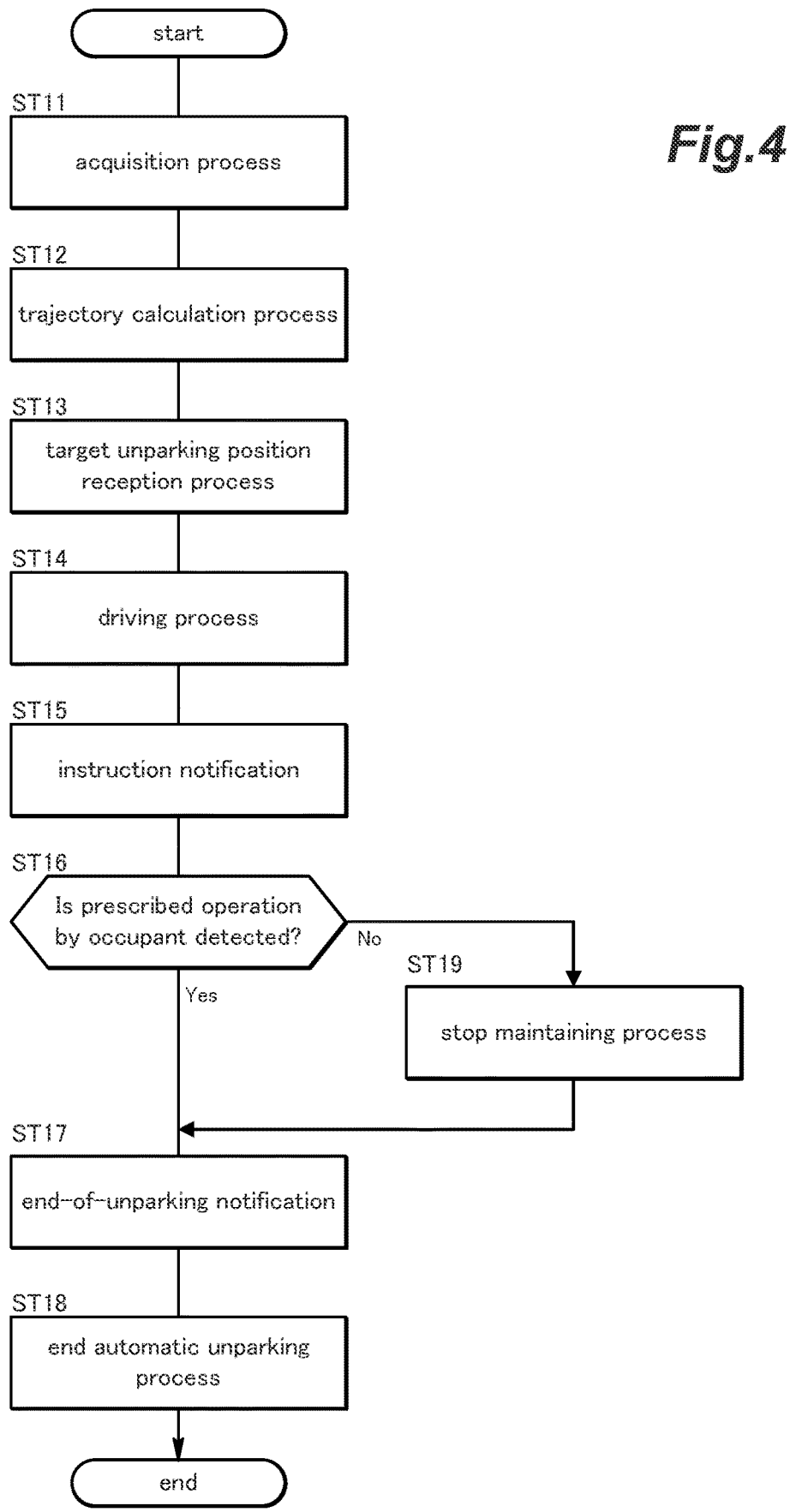
FIG. 4 is a flowchart of an automatic unparking process.

Next, with reference to FIG. 4, description will be made of the automatic unparking process that is executed by the action plan unit 43 after an input is received by the parking main switch 34 in a vehicle parked in a parallel parking position (namely, the travel direction extends along the passage) between two other vehicles arranged in the fore and aft direction.

The action plan unit 43 first performs an acquisition process (ST11) to acquire one or more unparking spaces 61 (see FIG. 6B) from the external environment recognizing unit 41. More specifically, based on the signals from the external environment sensor 7, the external environment recognizing unit 41 detects the position and size of each of the obstacles (which may be vehicles in the surroundings) and presence of a sufficient space, in which the own vehicle can be accommodated, on the left side and/or the right side of the vehicle positioned in front of the own vehicle. The action plan unit 43 acquires these pieces of information detected by the external environment recognizing unit 41. In a case where it is determined that there is a sufficient space on each of the left side and the right side of the front vehicle, the action plan unit 43 sets the unparking space 61 on each of the left side and the right side of the vehicle in front of the current position. In a case where it is determined that there is a sufficient space on either the left side or the right side of the front vehicle, the action plan unit 43 sets an unparking position candidate only on the side of the front vehicle where there is a sufficient space. In a case where it is determined that there is no sufficient space on the left side and the right side of the front vehicle, the action plan unit 43 causes the touch panel 32 to display a notification to notify the absence of sufficient space, and ends the automatic unparking process.

Subsequently, based on the positions of the vehicles in the surroundings acquired from the external environment recognizing unit 41, the action plan unit 43 performs a trajectory calculation process (ST12) to calculate a trajectory from the current position to each unparking space 61 detected. Specifically, the action plan unit 43 preferably calculates a trajectory along which the vehicle is first moved backward and then is moved forward to the unparking space 61. In a case where it is possible to move the vehicle to the unparking space 61 only by moving the vehicle forward without first moving the vehicle backward, the action plan unit 43 calculates a trajectory along which the vehicle is moved forward to the unparking space 61.

In a case where the trajectory of the vehicle can be calculated for a certain unparking space 61, the action plan unit 43 sets the unparking space 61 as an unparking position candidate where the vehicle can be unparked, and makes the touch panel 32 display the unparking position candidate on the screen (the unparking search screen). The action plan unit 43 calculates the trajectory for each of the unparking space 61 on the left side and the right side of the front vehicle, and if the trajectory can be calculated for both of the unparking spaces 61, set these unparking spaces 61 as unparking position candidates and makes the touch panel 32 display the both unparking position candidates. If no trajectory can be calculated from the current position to any unparking space 61 due to the presence of the obstacle, the action plan unit 43 preferably makes the touch panel 32 display a notification accordingly and and ends the automatic unparking process.

Figure 5A:
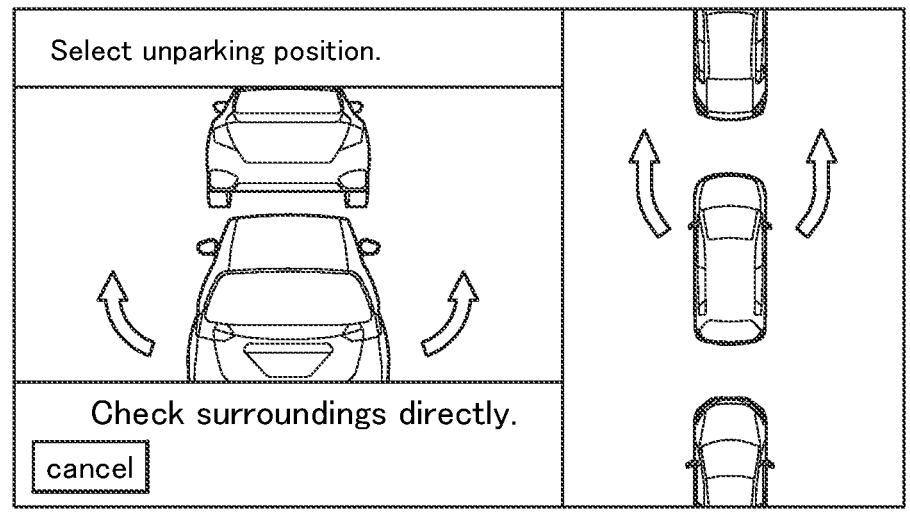
FIG. 5A is a diagram showing an example of the screen display of the touch panel during an acquisition process.
Figure 5B:
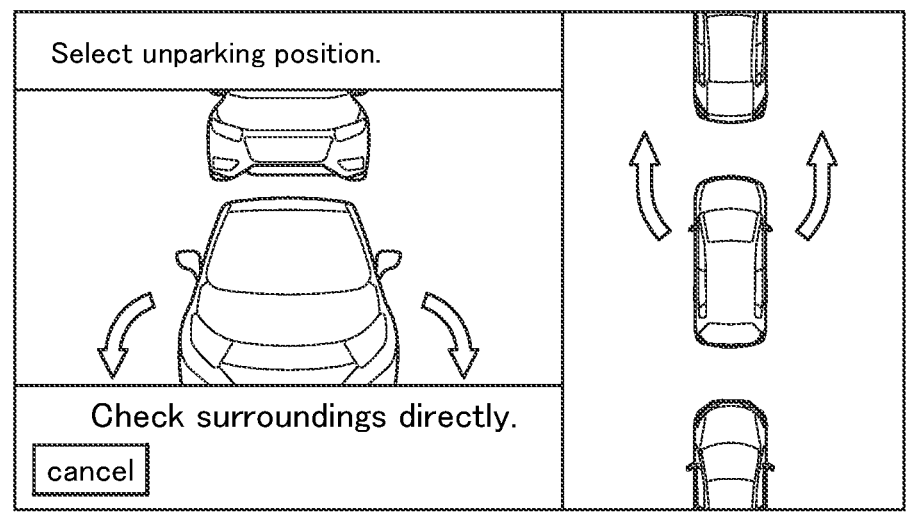
FIG. 5B is a diagram showing an example of the screen display of the touch panel during an acquisition process.

Next, the action plan unit 43 executes a target unparking position reception process (ST13) to receive a selection operation performed by the occupant to select the target unparking position, which is an unparking position where the occupant wants to unpark the vehicle, and is selected from the one or more unparking position candidates displayed on the touch panel 32. More specifically, the action plan unit 43 makes the touch panel 32 display the look-down image and the bird's-eye image in the travel direction on the unparking search screen. Here, the bird's-eye image in the travel direction is a bird's-eye image looking down on the front side of the vehicle as shown in FIG. 5A when the shift range is the parking range (parking position), the neutral range, or the drive (forward) range, and a bird's-eye image looking down on the rear side of the vehicle as shown in FIG. 5B when the shift range is the reverse (backward) range.

When the action plan unit 43 acquires at least one unparking position candidate, the action plan unit 43 makes the touch panel 32 display an arrow indicating the direction of the trajectory to each unparking position candidate in at least one of the look-down image and the bird's-eye image in an overlapping manner. In the illustrated embodiment, the action plan unit 43 makes the touch panel 32 display the arrow showing the direction of each trajectory in both of the look-down image and the bird's-eye image in an overlapping manner. In this way, since the action plan unit 43 makes the touch panel 32 display the direction of the trajectory to each unparking position candidate in the look-down image and/or the bird's-eye image in the unparking search screen in an overlapping manner, the occupant can easily understand the direction of the trajectory.

Also, the action plan unit 43 makes the touch panel 32 display the unparking search screen including a notification that instructs the driver to select the unparking position (the target unparking position) in order to receive the selection operation of the target unparking position. The selection operation of the target unparking position may be performed via the touch panel 32, or may be performed via the selection input member 35.

After the target unparking position is selected by the driver, the action plan unit 43 makes the touch panel 32 switch the screen from the unparking search screen to the unparking screen, and executes a driving process (ST14) to make the vehicle travel along the calculated trajectory. As a condition for starting the driving process, the action plan unit 43 preferably sets at least one operation such as an operation of an operation member (such as a button) specifically provided for starting the driving process, an operation of temporarily pressing the brake pedal 24, an operation of releasing the parking brake, an operation of moving the shift lever 25 to the range appropriate for the travel direction, or the like. In this case, the action plan unit 43 preferably makes a notification to prompt the occupant (driver) to perform an operation set as the start condition by display on the touch panel 32, by voice guidance, etc.

During the driving process, the action plan unit 43 controls the vehicle based on the position of the vehicle acquired by the GPS receiving unit 20 and the signals from the external camera 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle from forward to backward or from backward to forward. The switching operation may be executed repeatedly, or may be executed only once. During the driving process, the action plan unit 43 may acquire the travel direction image from the external camera 19 and make the touch panel 32 display the acquired image on the left half thereof.

Figure 6A:
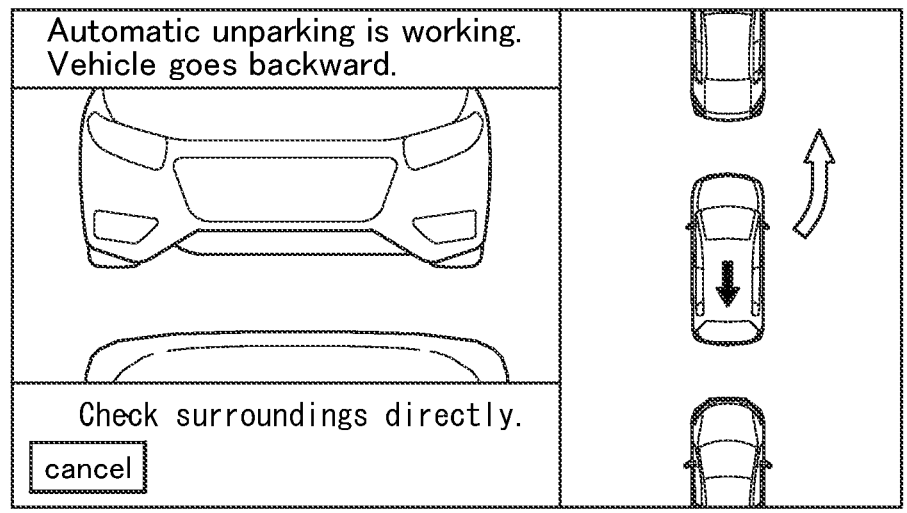
FIG. 6A is a diagram showing an example of the screen display of the touch panel during the driving process.

More specifically, the unparking screen is a screen in which an image in the travel direction of the vehicle is displayed on the left half of the touch panel 32 and the look-down image including the vehicle and its surrounding area is displayed on the right half thereof. Therefore, in a case where the trajectory includes a backward trajectory along which the vehicle is to be first moved backward, the action plan unit 43 makes the touch panel 32 display a rear-side image (rear view) of the vehicle captured by the rear camera on the left half thereof, as shown in FIG. 6A. When the vehicle is moved backward, the action plan unit 43 makes the touch panel 32 display a backward arrow indicating the travel direction so as to overlap with the image representing the own vehicle displayed in the look-down image. Thereby, the occupant can understand that the vehicle is moved backward.

Figure 6B:
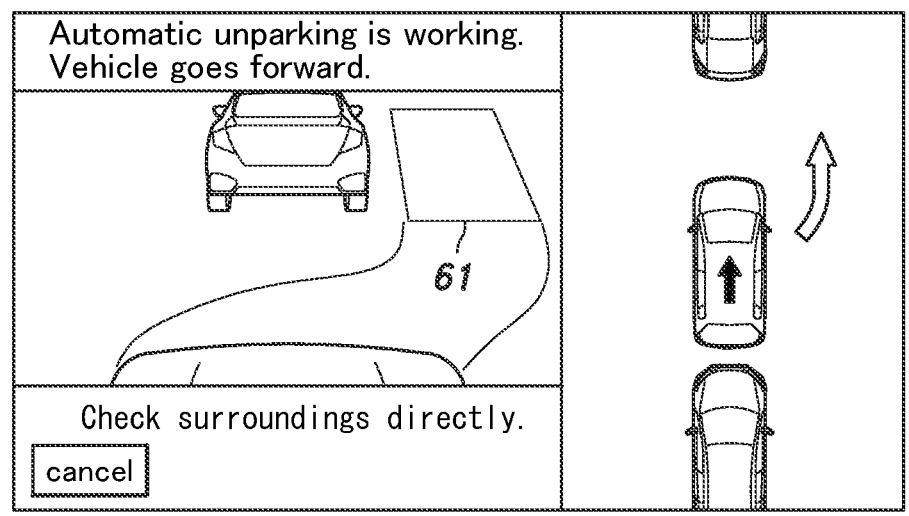
FIG. 6B is a diagram showing an example of the screen display of the touch panel during the driving process.

When the backward movement is completed and the vehicle starts moving forward, or in a case where the trajectory does not include the backward trajectory for first moving the vehicle backward, the action plan unit 43 makes the touch panel 32 display a front-side image (front view) of the vehicle captured by the front camera on the left half thereof, as shown in FIG. 6B. When the vehicle is moved forward, the action plan unit 43 makes the touch panel 32 display a forward arrow indicating the travel direction so as to overlap with the image representing the own vehicle in the look-down image. Thereby, the occupant can understand that the vehicle is moved forward. At this time, the action plan unit 43 preferably makes the touch panel 32 display a frame indicating the target unparking position selected from the one or more unparking position candidates (unparking spaces 61) and the trajectory to the target unparking position so as to overlap with the front-side image.

When the vehicle state determining unit 46 determines that the vehicle is in the prohibition state during the driving process, the action plan unit 43 displays a notification that the automatic unparking is suspended or canceled on the touch panel 32 and executes a deceleration process to decelerate the vehicle to stop the same. Thus, when there is a predetermined operation input by the occupant via the operation input member 11, the action plan unit 43 executes the deceleration process, whereby uneasiness that would be felt by the occupant if the movement of the vehicle were continued can be avoided.

Figure 7A:
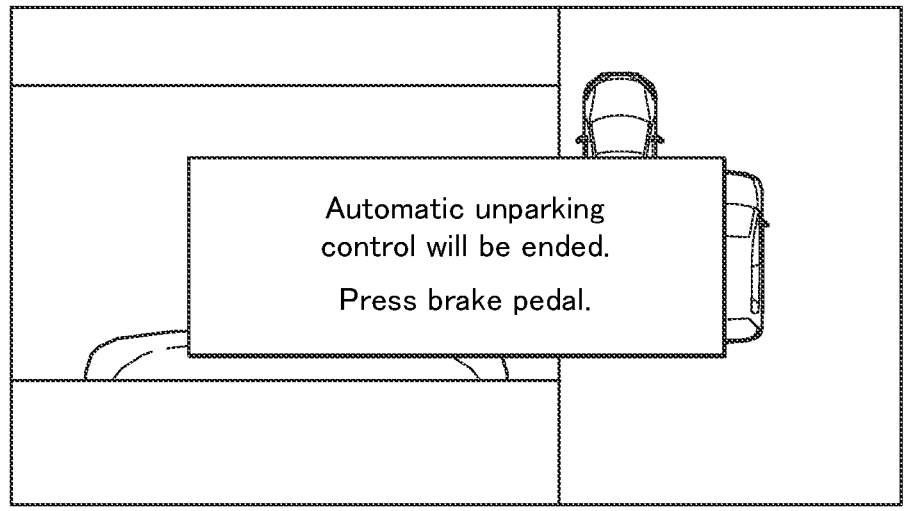
FIG. 7A is a diagram showing an example of the screen display of the touch panel during the automatic unparking process when an instruction notification is displayed.

When the vehicle reaches the target unparking position, the action plan unit 43 stops the vehicle and ends the driving process. Subsequently, the action plan unit 43 causes the HMI 14 to output an instruction notification (ST15). The instruction notification is a notification for request the occupant to perform a prescribed operation on the operation input member 11. In the present embodiment, the prescribed operation on the operation input member 11 is a pressing operation of the brake pedal 24 for activating the brake device 5. In another embodiment, the prescribed operation on the operation input member 11 may include at least one of the pressing operation of the brake pedal 24, grasping of the steering wheel 22, and operation of the shift lever 25 to the parking range. The instruction notification includes at least one of image information and/or text information displayed on the touch panel 32 and voice and/or notification sound output from the sound generating device 33. Tor example, the instruction notification may be a pop-up message displayed on the screen of the touch panel 32, as shown in FIG. 7A, or may be a voice message, such as "Press brake pedal," output from the sound generating device 33. The instruction notification is output to request the occupant to perform the prescribed operation thereby to make the occupant recognize that vehicle control is transferred from the vehicle to the occupant. Also, since the prescribed operation requested by the instruction notification is the pressing operation of the brake pedal 24, it is possible to transfer vehicle control to the occupant in a state where the vehicle is stopped by the operation performed by the occupant.

The action plan unit 43 detects whether the prescribed operation corresponding to the instruction notification has been input by the occupant based on the signal from the driving operation sensor 12 (ST16). In the case where the prescribed operation is pressing of the brake pedal 24, the action plan unit 43 detects pressing of the brake pedal 24 based on the signal from the brake sensor 27.

Figure 7B:
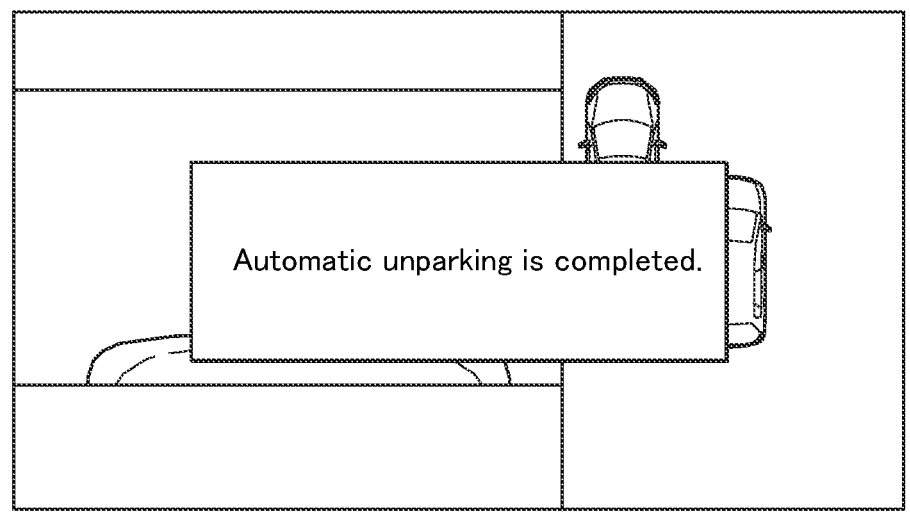
FIG. 7B is a diagram showing an example of the screen display of the touch panel when an end-of-unparking display is displayed.

When the prescribed operation by the occupant according to the instruction notification is detected within a prescribed period (Yes in ST16), the action plan unit 43 causes the HMI 14 to output an end-of-unparking notification (ST17) and ends the automatic unparking process (ST18). The end-of-unparking notification includes at least one of image information and/or text information displayed on the touch panel 32 and voice and/or notification sound output from the sound generating device 33. The end-of-unparking notification may be a pop-up message displayed on the screen of the touch panel 32, as shown in FIG. 7B, for example. Preferably, the action plan unit 43 causes the touch panel 32 to display the pop-up message serving as the end-of-unparking notification for a prescribed period of time. Thereafter, the action plan unit 43 erases the end-of-unparking notification from the touch panel 32, and preferably displays the operation screen of the navigation device 10 or the map screen on the touch panel 32.

When the prescribed operation by the occupant according to the instruction notification is not detected within the prescribed period (No in ST16), the action plan unit 43 executes a stop maintaining process to restrict the rotation of the wheels of the vehicle (ST19). In the stop maintaining process, the action plan unit 43 executes at least one of switching of the shift position of the automatic transmission 16 to the parking range and activation of the brake device 5. As a result of execution of the stop maintaining process by the action plan unit 43, the vehicle is brought into a state where the movement thereof is restricted. After executing the stop maintaining process, the action plan unit 43 causes the HMI 14 to output the end-of-unparking notification (ST17) and ends the automatic unparking process (ST18).

The end-of-parking notification and the end-of-unparking notification output from the HMI 14 are preferably in notification modes that can be recognized to be identical by the occupant. Also, the end-of-parking notification and the end-of-unparking notification are preferably in an identical notification mode. For example, the end-of-parking notification and the end-of-unparking notification each may be notification sounds output from the sound generating device 33. Alternatively, the end-of-parking notification and the end-of-unparking notification may be voice messages output from the sound generating device 33.

In the case where the end-of-parking notification and the end-of-unparking notification are notification sounds output from the sound generating device 33, it is preferred that the notification sound for the end-of-parking notification and the notification sound for the end-of-unparking notification are similar to each other to such an extend that the occupant cannot distinguish the end-of-parking notification and the end-of-unparking notification from each other. Specifically, the end-of-parking notification and the end-of-unparking notification preferably consist of identical notification sound.

The end-of-parking notification and the end-of-unparking notification are voice messages output from the sound generating device 33, it is preferred that the messages consist of an identical message, such as "The process will be ended," for example. Further, in the case where the end-of-parking notification and the end-of-unparking notification are voice messages output from the sound generating device 33, it is preferred that the messages consist of largely identical messages, such as "The automatic parking process will be ended" and "The automatic unparking process will be ended," for example.

In the case where the end-of-parking notification and the end-of-unparking notification are messages and/or images displayed on the touch panel 32, it is preferred that the messages and/or images include the identical sentence, design, color tone, etc. so that the occupant can recognize as identical. For example, it is preferred that the size and color tone of the message windows are identical.

Preferably, the instruction notification and the end-of-unparking notification are made in different notification modes. It is preferred that the instruction notification and the end-of-unparking notification can be clearly distinguished from each other by the occupant. For example, the instruction notification may be a voice message such as "Press the brake pedal" while the end-of-unparking notification may be a notification sound.

Thereby, the driver can recognize the end of the automatic parking process and the automatic unparking process based on the end-of-parking notification and the end-of-unparking notification. Also, since the driver is requested to perform a prescribed operation according to the instruction notification before the automatic unparking process is ended, the driver can recognize that vehicle control is transferred to the driver.

In the parking assist system 1 according to the above-described embodiment, the occupant can recognize the end of the automatic parking process and the automatic unparking process based on the end-of-parking notification and the end-of-unparking notification. Further, since the occupant is requested to perform a prescribed operation according to the instruction notification before the automatic unparking process is ended, the occupant can recognize that vehicle control is transferred to the occupant.

The occupant can recognize the end of travel control including the automatic parking process and the automatic unparking process based on the end-of-parking notification and the end-of-unparking notification that are in the identical notification mode. Since the notification modes of the end-of-parking notification and the end-of-unparking notification are identical to each other, the kinds of notification mode can be limited. Thereby, the meanings of the notifications that the occupant should learn are reduced, and the convenience can be improved.

Further, since the instruction notification and the end-of-unparking notification are made in different notification modes, the occupant can recognize the instruction notification in distinction from the end-of-unparking notification.

Concrete embodiments of the present invention have been described in the foregoing, but various modifications and alterations are possible without being limited by the above-described embodiments.

The invention claimed is:

1. A parking assist system, comprising:
a control device configured to control a powertrain including a transmission, a brake device, and a steering device to execute an automatic parking process in which a vehicle is autonomously moved to a target parking position and an automatic unparking process in which the vehicle is autonomously moved to a target unparking position;
a notification device configured to be controlled by the control device to make a notification to an occupant of the vehicle; and
an operation member configured to receive an operation performed by the occupant,
wherein the control device is configured
to cause the notification device to output an end-of-parking notification when, in the automatic parking process, the vehicle has reached the target parking position and the control device ends the automatic parking process, and
to cause the notification device to output an instruction notification to request the occupant to perform a prescribed operation on the operation member when, in the automatic unparking process, the vehicle has reached the target unparking position and the control device ends the automatic unparking process, and to cause the notification device to output an end-of-unparking notification when the prescribed operation is detected,
and wherein the end-of-parking notification and the end-of-unparking notification are in an identical notification mode and consist of identical notification sound.

2. The parking assist system according to claim 1, wherein the end-of-parking notification and the end-of-unparking notification are in notification modes that are capable of being recognized as identical by the occupant.

3. The parking assist system according to claim 1, wherein the instruction notification and the end-of-unparking notification are in different notification modes.

4. The parking assist system according to claim 1, wherein the prescribed operation is an operation of the operation member for activating the brake device or the powertrain.

5. The parking assist system according to claim 1, wherein when the prescribed operation is not detected during a prescribed period after the control device caused the notification device to output the instruction notification, the control device executes a stop maintaining process to restrict rotation of a wheel of the vehicle, causes the notification device to output the end-of-unparking notification, and ends the automatic unparking process.

6. The parking assist system according to claim 5, wherein in the stop maintaining process, the control device performs at least one of setting of a shift position of the transmission in a parking range and activation of the brake device.

* * * * *